United States Patent
Moras

(10) Patent No.: US 9,803,597 B2
(45) Date of Patent: Oct. 31, 2017

(54) CONTROL DEVICE FOR UNIFORMLY DISTRIBUTING GASES AND/OR LIQUIDS BETWEEN AT LEAST TWO CONTAINERS

(71) Applicant: Dr. Ing. h.c. F. Porsche Aktiengesellschaft, Stuttgart (DE)

(72) Inventor: Matthias Moras, Bad Liebenzell (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 70 days.

(21) Appl. No.: 15/018,955

(22) Filed: Feb. 9, 2016

(65) Prior Publication Data

US 2016/0230718 A1    Aug. 11, 2016

(30) Foreign Application Priority Data

Feb. 10, 2015    (DE) .......................... 10 2015 101 886

(51) Int. Cl.
*F02B 75/22*    (2006.01)
*F02M 35/10*    (2006.01)
(Continued)

(52) U.S. Cl.
CPC ...... *F02M 35/10222* (2013.01); *F01M 13/00* (2013.01); *F02M 25/0836* (2013.01);
(Continued)

(58) Field of Classification Search
CPC ........... F02M 35/10222; F02M 35/116; F02M 25/0836; F01M 13/00; F16N 25/00; Y02T 10/36; Y02T 10/32
(Continued)

(56) References Cited

U.S. PATENT DOCUMENTS

| 3,924,588 A | 12/1975 | Hager |
| 4,854,271 A * | 8/1989 | Miyano .................. F02B 27/02 123/184.31 |

(Continued)

FOREIGN PATENT DOCUMENTS

| DE | 1 601 389 | 4/1971 |
| DE | 36 36 403 | 5/1987 |

(Continued)

OTHER PUBLICATIONS

German Search Report of Oct. 27, 2015.

*Primary Examiner* — Marguerite McMahon
(74) *Attorney, Agent, or Firm* — Gerald E. Hespos; Michael J. Porco; Matthew T. Hespos

(57) ABSTRACT

A control device is provided for uniformly distributing gases and/or liquids between at least two containers with a different internal pressure, such as, fuel containers, crank casings and the like, in particular in internal combustion engines with more than one cylinder bank and a separate intake air feed per bank. The gas feed line assemblies (1) leading to the cylinder banks are connected to a chamber of a double-acting pressure box (4) and the gas flow in the gas feed line assembly (1) with the greater underpressure is reduced using a diaphragm (7) that is deflected as a result of a pressure difference in the gas feed line assemblies (1) by means of at least one throttle valve (10, 11) that can be activated via at least one sliding element (8, 9).

5 Claims, 1 Drawing Sheet

(51) Int. Cl.
  *F01M 13/00*  (2006.01)
  *F02M 25/08*  (2006.01)
  *F16N 25/00*  (2006.01)
  *F02M 35/116* (2006.01)

(52) U.S. Cl.
  CPC ........... *F16N 25/00* (2013.01); *F02M 35/116* (2013.01); *Y02T 10/32* (2013.01); *Y02T 10/36* (2013.01)

(58) Field of Classification Search
  USPC .................................................. 123/184.52
  See application file for complete search history.

(56) References Cited

U.S. PATENT DOCUMENTS

| | | | |
|---|---|---|---|
| 6,684,841 B2* | 2/2004 | Ekstrom | B60T 13/46 |
| | | | 123/184.21 |
| 2003/0111036 A1* | 6/2003 | Nomura | F02B 27/02 |
| | | | 123/184.53 |
| 2007/0017471 A1* | 1/2007 | Suzuki | F02M 35/024 |
| | | | 123/184.42 |
| 2009/0205620 A1 | 8/2009 | Enke | |
| 2009/0308337 A1 | 12/2009 | Imhof | |

FOREIGN PATENT DOCUMENTS

| | | |
|---|---|---|
| DE | 42 39 108 | 5/1994 |
| DE | 10 2004 012 130 | 9/2005 |
| DE | 20 2005 012 403 | 1/2007 |
| DE | 10 2006 051 062 | 5/2008 |
| DE | 10 2008 028 543 | 10/2009 |

\* cited by examiner

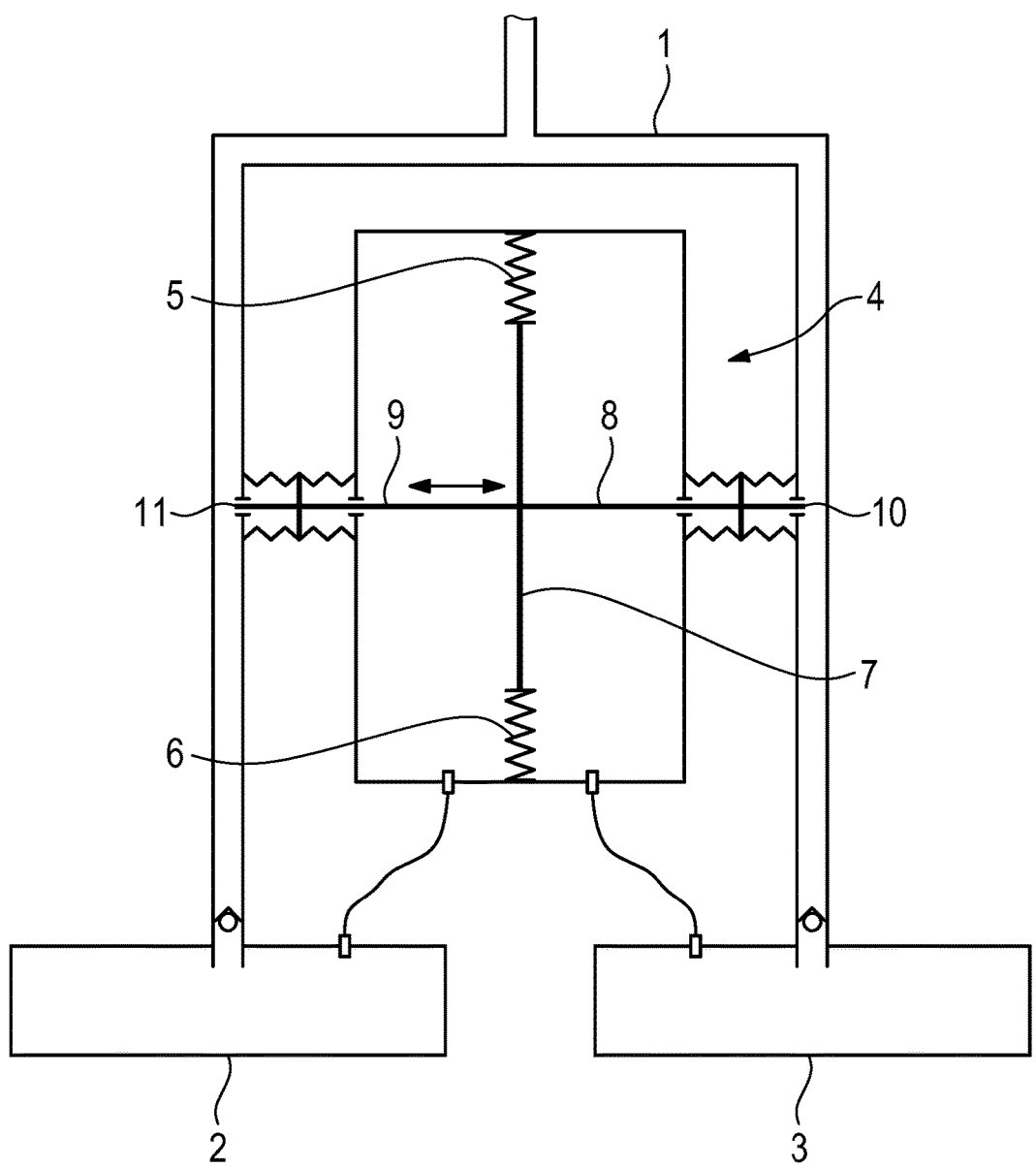

CONTROL DEVICE FOR UNIFORMLY DISTRIBUTING GASES AND/OR LIQUIDS BETWEEN AT LEAST TWO CONTAINERS

CROSS REFERENCE TO RELATED APPLICATION

This application claims priority under 35 USC 119 to German Patent Appl. No. 10 2015 101 886.1 filed on Feb. 10, 2015, the entire disclosure of which is incorporated herein by reference.

BACKGROUND

1. Field of the Invention

The invention relates to a control device for uniformly distributing gases and/or liquids between at least two containers with a different internal pressure, such as, for example, fuel containers, crank casings and the like, in particular in internal combustion engines with more than one cylinder bank and a separate intake air feed per bank.

2. Description of the Related Art

Devices for crank casing venting are known from the prior art, see for example DE 1 601 389 A. In this context, gases emerging unburnt from the combustion chamber are fed back to the combustion chamber to prevent them from getting into the surrounding air. However, in this context it must be ensured that engine oil and the like is not mixed with the gases that are fed back into the combustion chambers. DE 1 601 389 A proposes arranging venting lines on the four outer upper points of the interior of the crank casing and making these venting lines open into the intake manifold via one control valve in each case.

DE 10 2006 051 062 A1 proposes arranging a pressure control diaphragm valve for the crank casing venting. In this way, an excessive rise in pressure in the crank casing as a result of gases escaping from the combustion chambers is to be prevented. U.S. Pat. No. 3,924,588 also discloses a pressure control device which is of a very similar design compared to the abovementioned documents.

Although these documents are concerned with crank casing venting, it cannot be inferred therefrom how a uniform distribution of pressure in the crank casing in the internal combustion engines with, for example, two cylinder banks could be achieved.

SUMMARY

The invention relates to internal combustion engines with plural cylinder banks and with a separate intake air feed to each of the cylinder banks. Additionally, the invention avoids unequal distribution of the gases that are introduced into the intake air, for example gases that are introduced from fuel tank venting and crank casing venting. Such unequal distribution can occur when there are very small pressure differences between the two cylinder banks and can lead to faults and adverse effects in the combustion process.

The invention is configured so that the gas feed line assemblies leading to the cylinder banks are connected to a chamber of a double-acting pressure box and the gas flow in the gas feed line assembly with the greater underpressure is reduced using a diaphragm that is deflected as a result of a pressure difference in the gas feed line assemblies by means of a throttle valve that can be activated via a sliding element.

The diaphragm can be embodied in a spring-elastic fashion or can be suspended from springs on one side or on both sides to return them to the home position again when pressure equalization occurs.

This very simple technical solution achieves extremely effective uniform distribution of the gases that are introduced into the intake air in internal combustion engines with, for example, two cylinder banks. This uniform distribution is of particular significance in the throttled operating mode of an internal combustion engine.

An exemplary embodiment of the subject matter of the invention is illustrated schematically in the drawing. The subject matter of the invention is described below with reference to this exemplary embodiment.

BRIEF DESCRIPTION OF THE DRAWING

The FIGURE is a schematic illustration of a control device in accordance with the invention.

DETAILED DESCRIPTION

Gases from the crank casing venting or the fuel tank venting downstream of the throttle valve are fed via gas feed lines 1 into the combustion gas intake system 2 of a first cylinder bank and in parallel into the combustion gas intake system 3 of a second cylinder bank. Pressure differences in the combustion gas intake systems 2 and 3 of the two cylinder banks are detected by a double-acting pressure box 4 that is connected to the gas feed line assemblies. A diaphragm 7 is suspended from springs 5 and 6 and is deflected from a normal position in the event of a pressure difference between the combustion gas intake systems 2 and 3. The deflection of the diaphragm 7 causes movement of sliding elements 8 and 9, and this movement of sliding elements 8 and 9 activates throttle valves 10 and 11 in the gas feed line assemblies 1 leading to the cylinder banks 2 and 3. This configuration ensures uniform distribution of the gases additionally introduced into the intake air, between the two cylinder banks.

LIST OF REFERENCE SIGNS

1 Gas feed line assemblies
2 Combustion gas intake system of the first cylinder bank
3 Combustion gas intake system of the second cylinder bank
4 Double acting pressure box
5, 6 Springs
7 Diaphragm
8, 9 Sliding element
10, 11 Throttle valve

What is claimed is:

1. A control device for uniformly distributing gases and/or liquids between at least two fuel containers or crank casings having different internal pressures and communicating with an internal combustion engine having more than one cylinder bank and a separate intake air feed per bank, comprising: gas feed line assemblies leading to the cylinder banks; a double-acting pressure box having a chamber connected to the gas feed line assemblies; a diaphragm in the chamber and disposed to deflect as a result of a pressure difference in the gas feed line assemblies; at least one sliding element connected to the diaphragm and moving in response to deflection of the diaphragm; and at least one throttle valve connected to the at least one sliding elements, the at least one throttle valve reducing a gas flow in the gas feed line assembly having a greater underpressure.

2. The control device of claim 1, wherein the at least one sliding element comprises two opposed sliding elements and wherein the at least one throttle valve comprises two opposed throttle valves connected respectively to the two opposed sliding elements.

3. The control device of claim 1, wherein the diaphragm is a spring-elastic diaphragm.

4. The control device of claim 1, wherein the diaphragm is suspended by at least one spring.

5. The control device of claim 1, wherein the diaphragm is suspended by springs on both sides.

\* \* \* \* \*